(12) United States Patent
Chipman et al.

(10) Patent No.: US 6,183,084 B1
(45) Date of Patent: *Feb. 6, 2001

(54) PROGRESSIVE ADDITION LENSES (75) Inventors: Russell A. Chipman, Salem; Patrick John Reardon, Roanoke, both of VA (US)

(73) Assignee: Johnson & Johnson Vision Care, Inc., Jacksonville, FL (US)

(*) Notice: Under 35 U.S.C. 154(b), the term of this patent shall be extended for 0 days.

This patent is subject to a terminal disclaimer.

(21) Appl. No.: 09/126,259

(22) Filed: Jul. 30, 1998

(51) Int. Cl.[7] .................. G02C 7/02; G02C 7/06
(52) U.S. Cl. .................. 351/176; 351/169; 351/177
(58) Field of Search .................. 351/176, 169, 351/177, 159, 160 R, 160 H, 41; 623/6, 6.11, 6.23

(56) References Cited

U.S. PATENT DOCUMENTS

| | | | |
|---|---|---|---|
| 3,623,800 | * 11/1971 | Volk | 351/169 |
| 3,711,191 | 1/1973 | Tagnon | 351/169 |
| 4,153,339 | * 5/1979 | Tajima et al. | 359/681 |
| 4,253,747 | 3/1981 | Maitenaz | 351/169 |
| 4,676,610 | 6/1987 | Barkan et al. | 351/169 |
| 4,859,261 | 8/1989 | Ace | 156/102 |
| 4,861,153 | 8/1989 | Winthrop | 351/169 |
| 4,946,270 | 8/1990 | Guilino et al. | 351/169 |
| 4,955,712 | 9/1990 | Barth et al. | 351/169 |
| 5,042,936 | 8/1991 | Guilino et al. | 351/169 |
| 5,123,725 | 6/1992 | Winthrop | 351/169 |
| 5,148,205 | * 9/1992 | Guilino et al. | 351/159 |
| 5,335,026 | * 8/1994 | Kato et al. | 351/169 |
| 5,506,630 | 4/1996 | Ueno et al. | 351/169 |
| 5,771,089 | 6/1998 | Barth | 351/169 |
| 5,844,657 | 12/1998 | Shiraynagi | 351/169 |
| 6,000,798 | * 12/1999 | Chipman et al. | 351/176 |

FOREIGN PATENT DOCUMENTS

| | | | |
|---|---|---|---|
| 191831 | 1/1989 | (EP) | G02C/7/02 |
| 809126 | 11/1997 | (EP) | G02C/7/06 |
| 809127 | 11/1997 | (EP) | G02C/7/06 |
| 414890 | 1/1998 | (EP) | G02C/7/06 |
| 63-254415 | 10/1988 | (JP) | G02C/7/06 |
| 5-303063 | 11/1993 | (JP) | G02C/7/06 |
| WO 90/1238 | 10/1990 | (WO) | G02C/7/04 |
| WO 98/12591 | 3/1998 | (WO) | G02C/7/06 |
| WO 98/22848 | 5/1998 | (WO) | G02C/7/04 |

* cited by examiner

Primary Examiner—Georgia Epps
Assistant Examiner—Jordan M. Schwartz
(74) Attorney, Agent, or Firm—Lois Gianneschi (57) ABSTRACT

The present invention relates to ophthalmic lenses. In particular, the invention provides ophthalmic lenses with reduced astigmatism. The lenses are composed of a surface and a compensating surface, the surface geometries of which are defined by segments of a size suitable to be defined by a tenth order x,y polynomial with Zernike coefficients.

18 Claims, 6 Drawing Sheets

FIG. 1

|  | y=23mm | y=16mm | y=12mm |  | y=12mm | y=16mm | y=23mm |
|---|---|---|---|---|---|---|---|
| x=23mm | 116 | 115 | | | | 124 | |
| x=16mm | 117 | 105 | | | | 125 | |
| x=12mm | | | 106 | | 110 | | |
| | 118 | | 101 | | | | |
| x=12mm | | | | | | | |
| x=16mm | 119 | 107 | | | | 109 | 123 |
| x=23mm | 120 | 121 | | | | | |

(Cells: 101 center; 102, 103, 104, 105, 106, 107, 108 inner ring; 109–125 outer ring)

PROGRESSIVE ADDITION LENSES

FIELD OF THE INVENTION

The present invention relates to ophthalmic lenses. In particular, the invention provides ophthalmic lenses with reduced astigmatism.

BACKGROUND OF THE INVENTION

The use of ophthalmic lenses for the correction of ametropia is well known. For example, progressive addition lenses ("PAL's") are used for the treatment of presbyopia. On the front, or convex, surface of a PAL, three zones are provided: a distance vision zone with a refractive power suitable for distance vision; a near vision, or add power, zone, with refractive power for near vision; and an intermediate zone between the distance and near zones, with a refractive power for intermediate distance vision.

Inherent in ophthalmic lenses, such as PAL's, is an astigmatism introduced or caused by one or more of the lens surfaces, or a lens astigmatism. In PAL's, for example, the design of the front lens surface typically is constrained by the need to provide a distance zone and an add zone of maximum width connected by the intermediate zone obeying the following conditions:

$f(x, y, z)$ is continuous;

$\partial f(x, y, z)/\partial(x, y)$ is continuous; and $\partial^2 f(x, y, z,)/\partial(x^2, y^2, xy)$ is continuous over all x, y, z.

Such a surface inevitably introduces an astigmatism into the lens. Generally, the back, or concave, lens surface of a lens is not used to compensate for the astigmatism introduced by the front surface and, in fact, may also contribute to the lens astigmatism. Rather, the back surface typically is a spherical or toric surface intended to combine with the front surface to provide the wearer's required prescription.

Any number of lens designs have been tried to reduce lens astigmatism. However, although the known designs provide some minimal decrease in the astigmatism, large areas in the lenses' peripheries still are unusable due to the astigmatism.

DESCRIPTION OF THE INVENTION AND ITS PREFERRED EMBODIMENTS

The present invention provides lenses, as well as methods for their design and production, in which lens astigmatism, or the astigmatism caused by one or more surfaces of the lens, is reduced. For purposes of the invention, by "lens" or "lenses" is meant any ophthalmic lens including, without limitation, spectacle lenses, contact lenses, intraocular lenses and the like. Preferably, the lens of the invention is a spectacle lens and, more preferably, the spectacle lens is a progressive addition lens, or a lens in which one or more surfaces provide zones with refractive power suitable for distance, near and intermediate vision.

In the lenses of the invention, reduction of lens astigmatism is achieved by use of a compensating surface that compensates for the astigmatism introduced by the one or more of the other lens surfaces. By "compensate" is meant that the lens astigmatism is reduced by about 15 percent or greater, preferably about 25 percent or greater, more preferably about 35 percent or greater of the nominal add power, or desired add power, of the lens. In one embodiment, the invention comprises, consists essentially of, and consists of a lens having an astigmatism caused by at least one surface of the lens, the lens comprising, consisting essentially of, and consisting of a front surface and a compensating surface that compensates for the lens astigmatism.

The lenses of the invention may be made of any known material suitable for their construction. If the lens is of a homogeneous composition, meaning-that the lens material is of a uniform refractive index, the compensating surface may be the back surface of the lens. For example, the lens may have a toroidal, aspheric compensating surface designed to compensate for the astigmatism introduced by the front lens surface.

Alternatively, the lens may be multilayered, the compensating surface between the front and back lens surfaces. Thus, in another embodiment the invention comprises, consists essentially of, and consists of a lens having an astigmatism caused by at least one surface of the lens, the lens comprising, consisting essentially of, and consisting of, a front surface, a back surface, and a compensating surface that compensates for the lens astigmatism. The back surface may be of any desired shape such as spherical, aspherical, cylindrical, or toroidal.

The lens of the invention is produced by the method comprising, consisting essentially of, and consisting of the steps of: a.) dividing a front surface of a lens into a first plurality of segments, each of the plurality of segments of a size suitable for a tenth order x, y polynomial with Zernike coefficients to define a geometry for each segment; b.) providing a compensating surface the compensating surface divided into a second plurality of segments of a size suitable for a tenth order x, y polynomial with Zernike coefficients to define a geometry for each segment; and c.) optimizing the compensating surface to reduce the lens astigmatism.

Although, the method for producing and designing the lens of the invention may be used to design any lens, the invention will find its greatest utility in lenses that have an astigmatism producing surface, such as PAL's. Generally, in PAL's, this surface will be the front surface, but may be the back surface as well.

The design process of the invention begins with a three dimensional description of the front surface by any method known in the art. The front surface may contain the curvatures required for a PAL and be divided into distance, near and intermediate vision zones, the intermediate vision zone having a gradual change in refractive power along an eye path from the distance to the near zone.

Figure 1:
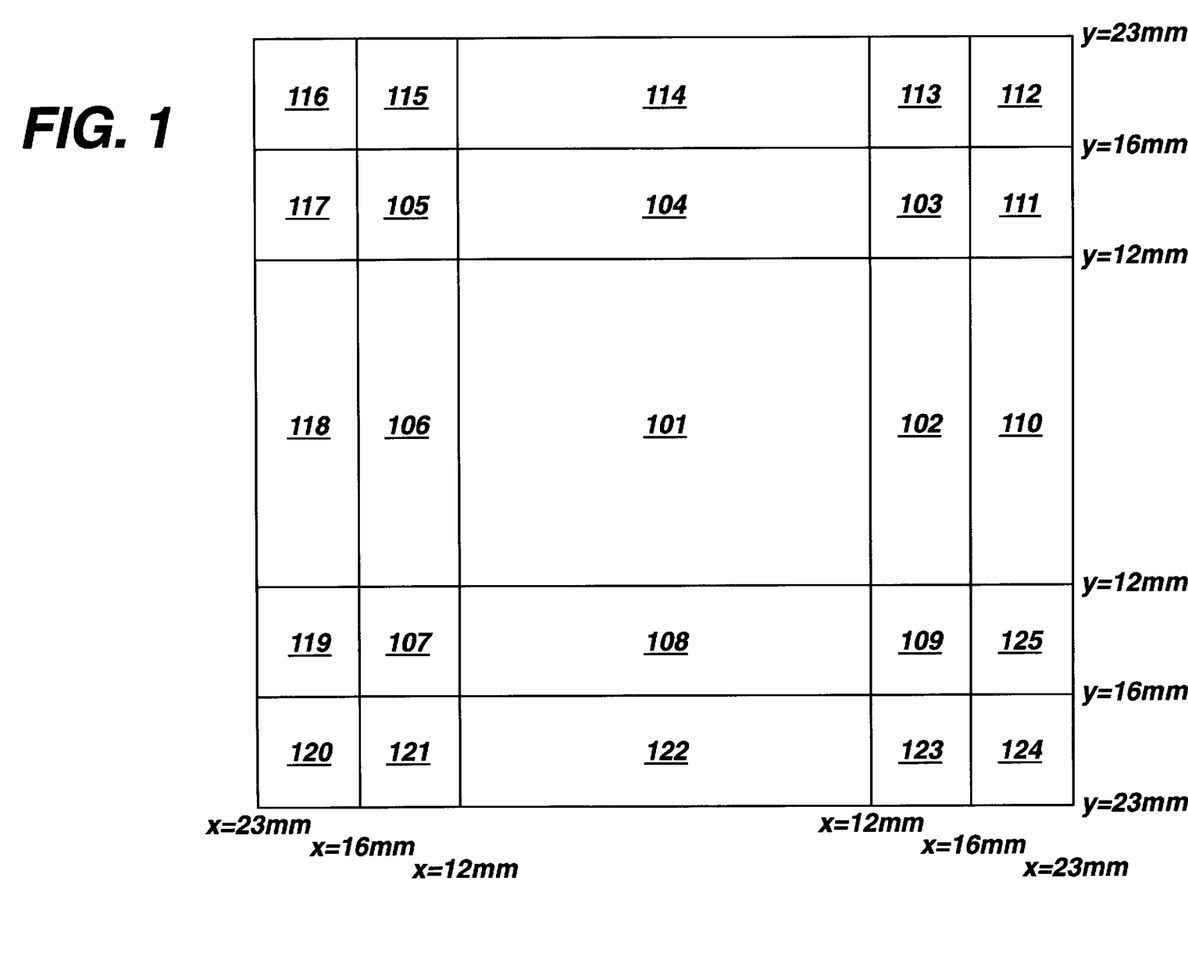
FIG. 1 is a diagrammatic view of a front surface of a lens of the invention.

In the present invention, the front surface is divided, or segmented, into a number of segments, shown in FIG. 1 as 101 through 125. The geometry of each segment is defined in terms of a tenth order x, y polynomial with Zernike coefficients. The number of zones, or segments, is determined by dividing the total area of the surface by the maximum area that can be covered by each segment. One ordinarily skilled in the art will recognize that this maximum area, or segment size, will depend on the portion of the surface under consideration and as well as a consideration of the maximum area that can be adequately modeled using a single, tenth order x, y polynomial with Zernike coefficients. Thus, the maximum area of a segment may vary from, for example, the distance power zone to the intermediate zone.

The coefficients of each polynomial are computed to provide the desired power profile, to minimize astigmatism, and to provide sag, or depth, across segment boundaries, and the like. These coefficients may be computed by any known method, such as by using commercially available, optical design software.

Referring to FIG. 1, the x and y coordinate axes of the front surface are orthogonal to one another and tangent to the lens surface at their origins. The sag of the surface, z, is perpendicular to the x, y plane. The tenth order polynomial may be obtained by any known optimization process, such as the use of commercial optimization software. The precise polynomial will depend on the weights placed on the various constraints defining the boundary conditions of each optimization task. These boundaries include, without limitation, sag and slope continuities with neighboring zones, minimization of Zernike coefficients, variations in power, and the like. By placing a larger weight on any given constraint, optimization is directed towards that object. For example, a segment with decreased astigmatism may be obtained if the sag continuity constraint is reduced.

The sag mismatch, or discontinuity, between segments for the front surface of the lens of the invention preferably ranges form about 0 to about 0.01 microns. A total of twenty-five zones are used in FIG. 1 covering a circular area of 23 mm in radius.

Generally, the front surface is defined in terms of a base spherical surface with sufficient power to provide the desired distance vision correction. To the base sphere is added the sag corresponding to the additional power desired at each point. It is a discovery of the invention that the use of a polynomial of an order lower than the tenth provides a poor segment fit. Also, it is a discovery that polynomials of an order higher than the tenth are problematic in that they are difficult to optimize and require a greater number of computations.

Figure 2:
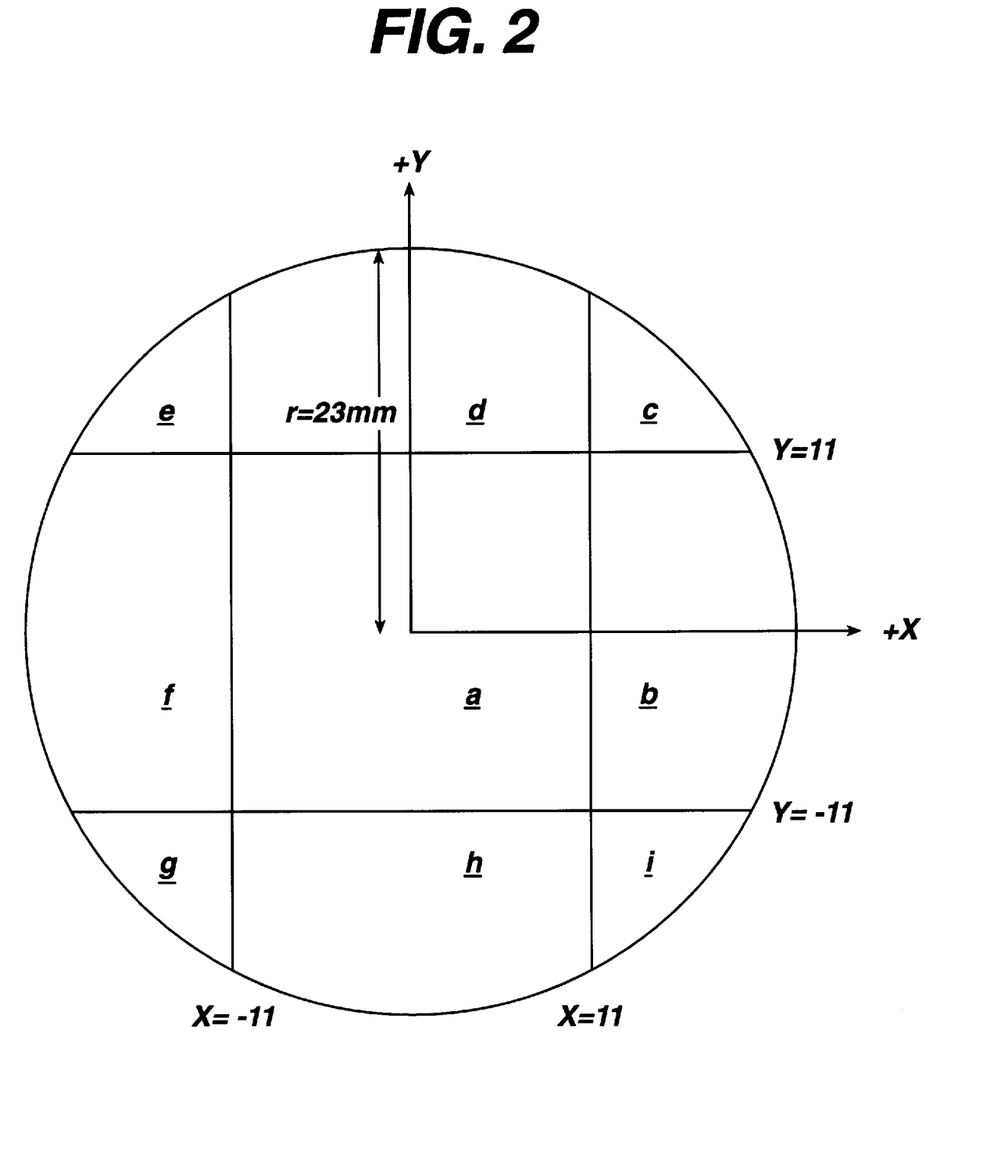
FIG. 2 is a plan view of a compensating surface of a lens of the invention.

A compensating surface is then provided. The compensating surface is divided into a number of segments as shown in FIG. 2. The number and geometry of the segments being determined as for the front surface.

The purpose of the compensating surface is to reduce the lens astigmatism to by about 15 percent or greater, preferably about 25 percent or greater, more preferably about 35 percent or greater of the nominal add power of the lens. The compensating surface is defined in terms of a base sphere and point by point departures from sphericity required for the compensation desired. The geometry of each segment of the compensating surface is defined by a tenth order x, y polynomial with Zernike coefficients determined as described for the front surface and using an optimization process, such as for example one that includes a ray tracing task choosing a certain pupil diameter, and then measuring the size and shape of the image on an image surface constructed before the optimization started. The compensating surface is then optimized so that the lens astigmatism is reduced. One ordinarily skilled in the art will recognize that any number of optimization methods known in the art, as for example those disclosed in "General Optics and Optical Design" P. Pouroulis and J. MacDonald, Oxford Univ. Press (1997) incorporated herein by reference, may be used.

For example, trial functions may be combined with the front surface geometry and optimized to minimize the Zernike coefficients controlling the astigmatism. Optimization may be preformed by any known method, such as the use of optical design software and the assigning of appropriate weights to the Zernike coefficients that control astigmatism. Alternatively, the optimization is achieved by creating an image surface at the eye rotation point optimizing each compensating surface segment using a merit function that includes image quality or spot size at the image planes as well as the Zernike coefficients most directly controlling astigmatism.

Additional constraints also may be placed on the organization protocol, such as power as a function of x and y coordinates, and prism. The sag of each polynomial at the boundary of each segment may be such that a discontinuous of continuous compensating surface is formed. By discontinuous is meant that the sag mismatch between segments is about 2 micron or greater. By a continuous surface is meant that the mismatch is less than about 2 microns. Preferably, a continuous surface is used. Other constraints may be placed in order to ensure that the slopes of power, astigmatism, and prism are continuous across segment boundaries.

The compensating surface is designed to provide either or both aspheric radially symmetric and radially asymmetric corrections for the radially symmetric and radially asymmetric astigmatisms of the front and/or back surface. Alternatively, the compensating surface is designed to provide aspheric radially asymmetric corrections and a back surface is used to provide the radially symmetric corrections.

In the lens of the present invention, if a toric correction is required in addition to the multifocal add power, the back surface of the lens must be placed with the toric axis at a specific angular orientation with respect to the umbilical meridional. In this case, the compensating surface cannot form the lens' back surface because, the back surface cannot provide compensation for lens astigmatism. Thus, in such cases, one or more compensating surfaces between the front and back surface provide all of the lens astigmatism compensation.

In an embodiment of the present invention, the compensating surface may form the back lens surface, prior to application of any coatings, provided that no toric correction is required. The compensating surface may also be provided with radially symmetric aspheric corrections to minimize spherical aberration and further improve image quality. One ordinarily skilled in the art will recognize that the shape of the compensating surface will be determined by whether that surface is being used as the back surface of the lens or a surface intermediate the front and back surface.

The back surface of the lens of the invention is provided by defining the surface in terms of two radii of curvatures, corresponding to the base and toric curves as well as a radial aspheric component that is defined in terms of a conic section. The back surface is designed using segments defined by tenth order x, y polynomials with Zernike coefficients, as in the case of the front and compensating surfaces. The base curve of the back surface is selected to provide the spherical correction required by the prescription. In addition to providing the correct spherical and toric powers, the back surface may be aspherized to provide higher order corrections of the Zernike coefficients, such as the third order correction for coma, or the fourth order correction for spherical aberration. It is known by those ordinarily skilled in the art that the quality of the retinal image is significantly affected by aberrations arising from higher order Zernike coefficients, in addition to the lower order coefficients controlling defocus and astigmatism.

The lens of the invention may be made by any convenient method. Preferably, the lens is made by fabricating a lens that has a front surface of a specified geometry and a compensating surface with the desired geometry. The optical material used to form the lens of the invention may be any melt processable thermoplastic resin, including without limitation a polycarbonate of bisphenol-A, or a thermoset resin, including without limitation diethylene glycol bisallyl carbonate. The material may be formed into a lens by any known method, such as injection, compression, or cast molded, or a combination thereof using any convenient means of polymerization.

In the case in which a back surface is provided in addition to the compensating surface, the lens may be formed by any known method. Preferably, a preform, that is a front surface and a compensating surface with the desired geometries, is placed with its concave surface in juxtaposition with a toric mold the molding surface of which is designed to provide the desired back surface geometry, such as a toroidal, aspheric surface. The space between the preform and mold is filled with a polymerizable resin which is then polymerized to form a rigid, adherent layer permanently attached to the preform. The angular orientation between the principal meridian on the front surface and the toric axis of the mold may be adjusted prior to initiating polymerization so that the toric axis formed is at the desired orientation. In a preferred embodiment, the back surface provides only toric correction, although one ordinarily skilled in the art will recognize that it is possible to add any desired geometry by adding surface castings to the back surface.

In an alternative embodiment of the invention, a layer is provided that is bounded by the front surface and the compensating surface that is fabricated of an optical material of a high refractive index, meaning of a refractive index of at least 1.57. Suitable materials include, without limitation, polycarbonate, thermoset materials incorporating high index monomers, such as styrenes, 4-vinyl anisole, divinyl benzene, acrylate and methacrylate terminated monomers containing aromatic moieties such as alkoxylated bisphenol-A mono- and diacrylate, acrylate terminated aromatic polyurethanes, aromatic epoxides, or thermoplastic materials such as aromatic polyethers, polysulfides, and polyetherimides. A second layer bounded by the compensating surface and the back lens surface is provided that is fabricated of a material with a refractive index of less than about 1.57. The efficiency of compensation provided by the compensating surface will depend on the difference of the refractive indices of the two layers. The departure from sphericity, as measured by sag required for compensation, increases with the difference in refractive indices of the layers. In the embodiment, some or all of the desired spherical power may be provided by the layer bound by the front and compensating surfaces and the toric power may be provided by the layer bound by the compensating and back surface. The difference in refractive indices used preferably is the maximum that is obtainable considering the material selected and the need to minimize interfacial reflection.

As an alternative embodiment of the lens of the invention, some or all of the compensation desired for the compensating surface may be incorporated into the front surface. The back surface is fabricated of a material having a refractive index of at least 1.57 allowing the reduction in the difference of refractive indices between the two layers to be less.

Such a lens may be formed by molding, casting, or grinding the front surface of an optical preform, the geometry of which provides some or all of the spherical and add power desired. The concave surface of the preform forms the compensating surface, which surface is molded, casted, or ground to provide the desired compensating geometry. The preform is of a material having at least a 1.57 refractive index. The back lens surface is formed on the preform by any convenient means, preferably by providing a mold and polymerizing a resin layer situated between the concave preform surface and the mold surface. The resin refractive index is selected so as to provide the desired difference in indices between the layer bound by the front and compensating surface and that bound by the compensating surface and the back surface of the lens.

Figure 3:
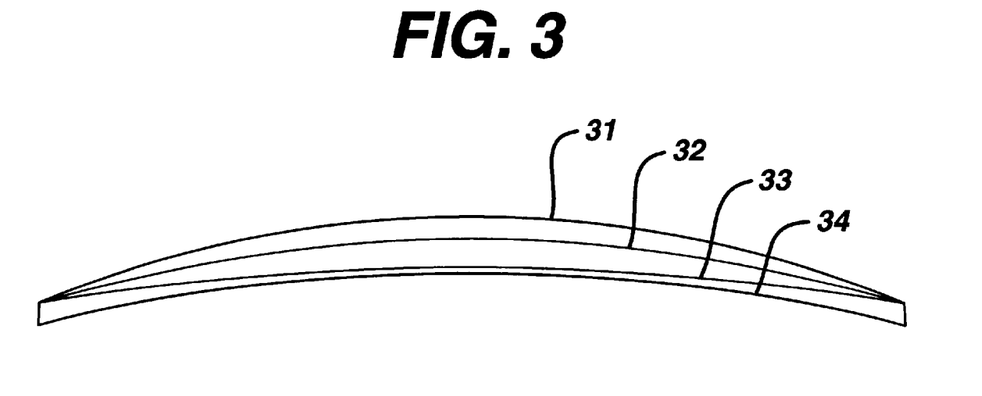
FIG. 3 is a side view of one embodiment of the lens of the invention.

In another alternative embodiment of the invention, one or more compensating surfaces are used to reduce the reflection from that surface and provide correction for chromatic aberration as shown in FIG. 3. Referring to FIG. 3, a front surface 31, a first compensating surface 32, and a second compensating surface 33 are provided. Back surface 34 provides toric correction. The material used for the second compensating layer 33 may be selected to have a chromatic dispersion opposite that of the material used for the first compensating layer 32. Suitable materials useful to correct for chromatic aberration are materials that incorporate chromophores strongly absorptive at near infra-red wavelengths while having little or no optical absorption in the visible wavelength range. Examples of such materials include, without limitation, naphthalocyanins exhibiting strong ligand filed absorption in the 900 to 1000 nm range and $d_2$ to $d_4$ metal complexes with near infra-red ligand filed absorptions, e.g., $Fe^{2+}$, $Co^{2+}$, $Ni^{2+}$ chelates, and the like. Preferably, more than one compensating surface is used to correct for chromatic aberration.

In yet another alternative, the constraint providing sag continuity between adjacent segments of the compensating surface may be selectively removed in order to further reduce astigmatism in the segments. It is important to ensure that the resulting sag discontinuity does not introduce an unacceptable level of prism jump by adjusting the weights attached to the minimization of the prism discontinuity during the optimization process until the discontinuity is equal to or less than about 0.5 diopters.

In yet another embodiment, one or more compensating surfaces are used, all of which surfaces are continuous, discontinuous, or a mixture thereof. In still another embodiment, the compensating surfaces each are composed of continuous and discontinuous portions.

The invention will be clarified further by a consideration of the following, non-limiting examples.

EXAMPLES

Example 1

Figure 4:
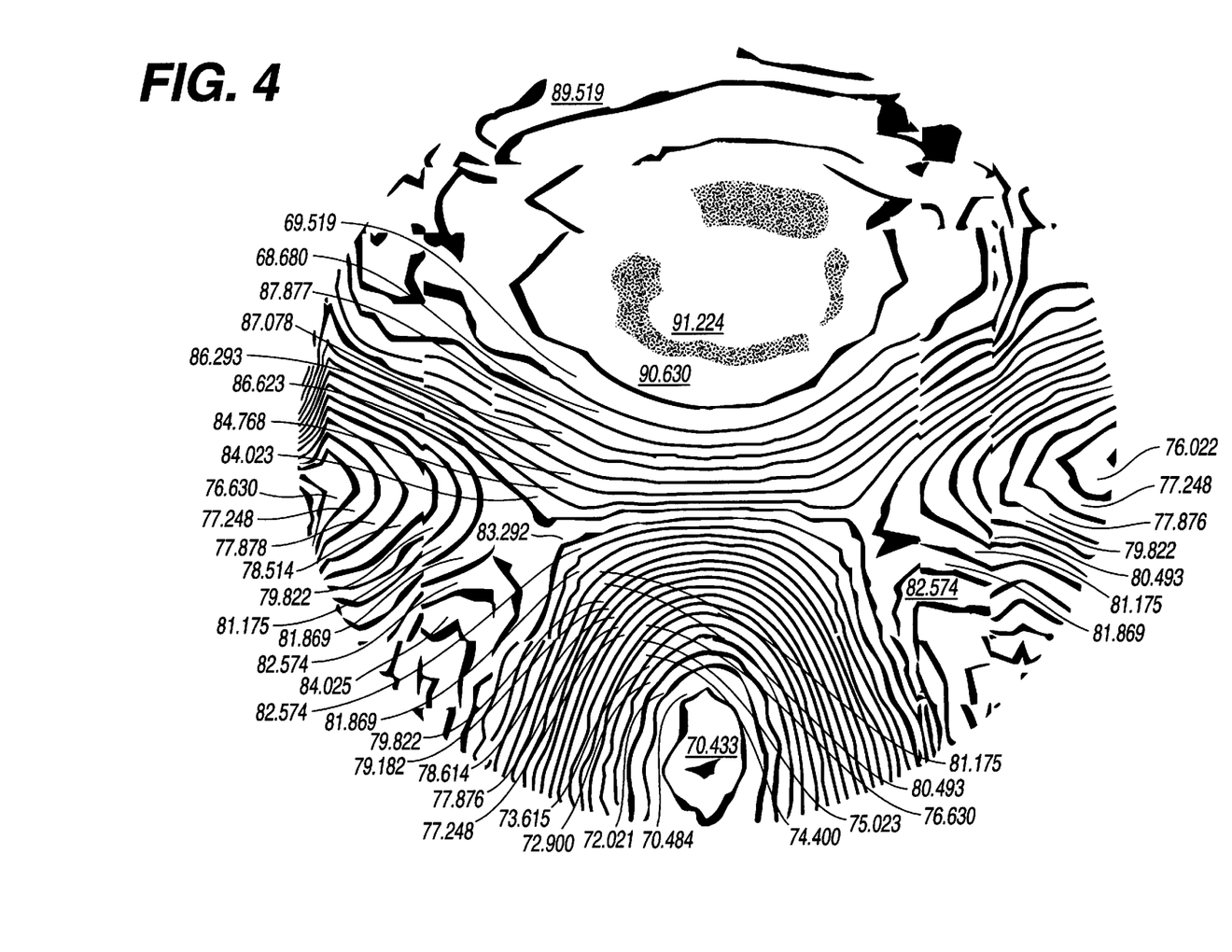
FIG. 4 is a depiction of the radius distribution of the overall optical zone power if a front surface of a lens of the invention.

A front surface of a lens of the invention was designed by dividing a 23 mm diameter surface is divided as shown in FIG. 1 into twenty-five segments, 101 through 125. Each segment was defined in terms of the tenth order, Zernike polynomial set forth on Table 1. The weights attached to the minimization of sag discontinuity at the segments' borders were adjusted until the sag discontinuity was 0.01 microns. On Table 1 is listed the coefficients of the tenth order polynomial used to fit segment 101. In FIG. 4 is shown the radius distribution over the overall optical zone of the front surface. Code V, a commercially available optical design software available from Optical Research Associates, Pasadena Calif., was used to model the optical performance of this optic and scale the sag values as needed in order to change the magnitude of the add power from 2.00 diopters to 1.75 diopters.

TABLE 1

| Term | Coefficient | Term | Coefficient | Term | Coefficient |
|---|---|---|---|---|---|
| $X$ | 2.9959E − 04 | $X^4Y^2$ | −1.3287E − 08 | $X^9$ | −5.7194E − 14 |
| $Y$ | 1.3627E − 02 | $X^3Y^3$ | 3.2104E − 09 | $X^8Y$ | −1.1805E − 13 |
| $X^2$ | −3.2144E − 04 | $X^2Y^4$ | −2.1453E − 08 | $X^7Y^2$ | −1.3143E − 13 |
| $XY$ | −2.6844E − 05 | $XY^5$ | 1.6867E − 08 | $X^6Y^3$ | 2.1387E − 13 |
| $Y^2$ | −2.2985E − 04 | $Y^6$ | −1.1813E − 09 | $X^5Y^4$ | 2.9089E − 14 |
| $X^3$ | −1.2719E − 06 | $X^7$ | 3.1168E − 11 | $X^4Y^5$ | −1.2660E − 13 |
| $X^2Y$ | −4.6118E − 05 | $X^6Y$ | 1.5823E − 10 | $X^3Y^6$ | −2.1756E − 14 |
| $XY^2$ | 2.8283E − 06 | $X^5Y^2$ | 1.4535E − 11 | $X^2Y^7$ | −1.0163E − 14 |
| $Y^3$ | −2.3678E − 05 | $X^4Y^3$ | 1.7491E − 10 | $XY^8$ | −1.3631E − 13 |
| $X^4$ | −4.6537E − 07 | $X^3Y^4$ | 4.0348E − 12 | $Y^9$ | 3.6008E − 13 |
| $X^3Y$ | −3.9656E − 07 | $X^2Y^5$ | 7.3962E − 10 | $X^{10}$ | 4.6851E − 15 |
| $X^2Y^2$ | 5.6116E − 06 | $XY^6$ | 7.6436E − 11 | $X^9Y$ | 2.8582E − 14 |
| $XY^3$ | −1.5922E − 07 | $Y^7$ | −1.8914E − 10 | $X^8Y^2$ | 1.0258E − 14 |
| $Y^4$ | 9.4637E − 07 | $X^8$ | −5.1259E − 12 | $X^7Y^3$ | 1.1640E − 14 |
| $X^5$ | −1.3593E − 09 | $X^7Y$ | −1.4894E − 11 | $X^6Y^4$ | −5.3647E − 14 |
| $X^4Y$ | 1.2154E − 07 | $X^6Y^2$ | −1.2730E − 11 | $X^5Y^5$ | 2.8809E − 14 |
| $X^3Y^2$ | 1.3703E − 06 | $X^5Y^3$ | −1.0932E − 11 | $X^4Y^6$ | −4.3787E − 15 |
| $X^2Y^3$ | −1.1170E − 07 | $X^4Y^4$ | 5.0458E − 11 | $X^3Y^7$ | 3.9563E − 14 |
| $XY^4$ | −1.9973E − 08 | $X^3Y^5$ | −1.8795E − 11 | $X^2Y^8$ | −5.3160E − 14 |
| $Y^5$ | 4.2527E − 08 | $X^2Y^6$ | 4.7034E − 11 | $XY^9$ | 4.0808E − 15 |
| $X^6$ | 2.1750E − 09 | $XY^7$ | −5.5050E − 12 | $Y^{10}$ | 6.3549E − 15 |
| $X^5Y$ | 3.3402E − 09 | $Y^8$ | −1.3198E − 12 | | |

Example 2

Figure 5:
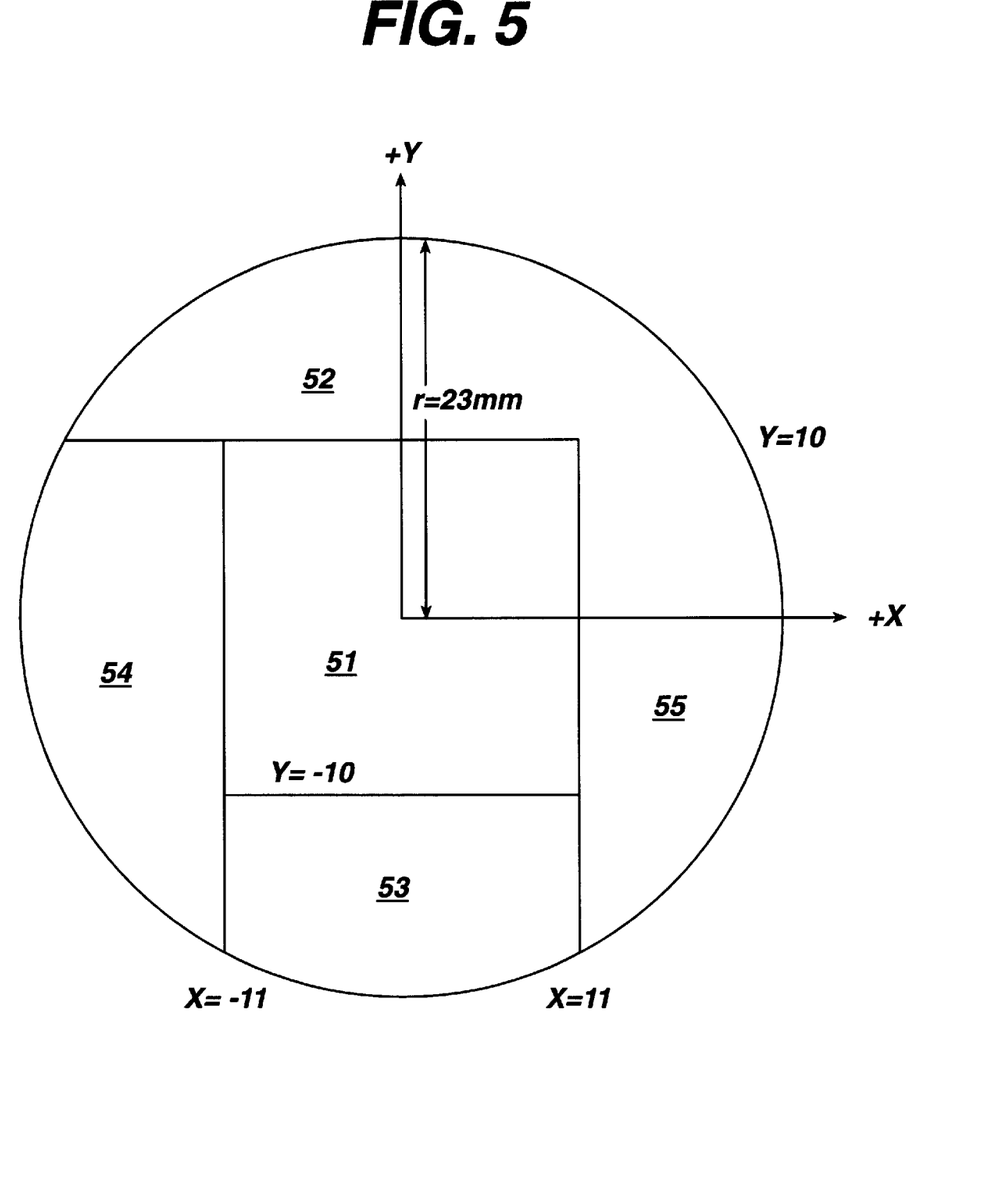
FIG. 5 is a plan view of a compensating surface of a lens of the invention.

FIG. 5 illustrates the x and y coordinates of the segments that constitute a compensating surface of the invention. Segment 51 contains the optical center of the optic and is the channel with a blend zone to the spherical section. Segment 52 is the distance zone and is left spherical. Segment 51 is described by the tenth order polynomial set forth on Table 2 obtained by optimizing this segment for minimum astigmatism and best image quality at an image surface as described above. The optimization protocol assigned specified weights to sag constraints at the top, y=10.0, line, second order derivatives using the continuity conditions shown on Table 1, Zernike coefficients, and the spot size of the image formed at the image surface. The sag discontinuity with the channels segment 602 was maintained to a value of 0.01 microns. On Table 2 is listed the coefficients of the polynomial developed to describe segment 53. The wings, segments 54 and 55, are tenth order polynomials optimized with sag, slopes, Zernike coefficients and spot size at the image surface.

TABLE 2

| Term | Coefficient | Term | Coefficient | Term | Coefficient |
|---|---|---|---|---|---|
| $X^0$ | 4.0730E − 03 | $X^1$ | −1.1190E − 03 | $X^2$ | −1.7264E − 03 |
| $X^3$ | −1.1712E − 04 | $X^4$ | −1.2035E − 04 | $X^5$ | 3.5938E − 05 |
| $X^6$ | 4.4477E − 06 | $X^7$ | 2.9691E − 07 | $X^8$ | 1.1208E − 08 |
| $X^9$ | 2.2584E − 10 | $X^{10}$ | 1.8916E − 12 | $Y$ | −5.9233E − 02 |
| $XY$ | −1.0295E − 02 | $X^2Y$ | −1.1153E − 03 | $X^3Y$ | −4.9870E − 07 |
| $X^4Y$ | −1.1567E − 04 | $X^5Y$ | −1.1316E − 05 | $X^6Y$ | −8.3565E − 07 |
| $X^7Y$ | −3.0455E − 08 | $X^8Y$ | −5.9808E − 10 | $X^9Y$ | −4.9098E − 12 |
| $Y^2$ | −1.0978E − 04 | $XY^2$ | −9.1776E − 05 | $X^2Y^2$ | 1.9888E − 05 |
| $X^3Y^2$ | 1.3878E − 05 | $X^4Y^2$ | 2.6856E − 06 | $X^5Y^2$ | 2.4296E − 12 |
| $X^6Y^2$ | 1.1505E − 08 | $X^7Y^2$ | 2.4296E − 10 | $X^8Y^2$ | 2.7402E − 07 |
| $Y^3$ | 5.9516E − 05 | $XY^3$ | −9.1729E − 07 | $X^2Y^3$ | −3.9879E − 05 |
| $X^3Y^3$ | −6.1659E − 06 | $X^4Y^3$ | −4.9074E − 07 | $X^5Y^3$ | −2.1523E − 08 |
| $X^6Y^3$ | −4.9346E − 10 | $X^7Y^3$ | −4.6135E − 12 | $Y^4$ | −2.7018E − 06 |
| $XY^4$ | −1.0059E − 06 | $X^2Y^4$ | −1.8065E − 7 | $X^3Y^4$ | −7.8954E − 09 |
| $X^4Y^4$ | 1.0659E − 06 | $X^5Y^4$ | 1.4961E − 11 | $X^6Y^4$ | 2.7573E − 13 |
| $Y^5$ | −1.3605E − 06 | $XY^5$ | −4.998E − 07 | $X^2Y^5$ | −5.169E − 08 |
| $X^3Y^5$ | −2.9916E − 09 | $X^4Y^5$ | −8.5253E − 11 | $X^5Y^5$ | −9.2168E − 13 |
| $Y^6$ | −2.1353E − 09 | $XY^6$ | −6.8412E − 09 | $X^2Y^6$ | 5.5626E − 10 |

TABLE 2-continued

| Term | Coefficient | Term | Coefficient | Term | Coefficient |
|---|---|---|---|---|---|
| $X^3Y^6$ | −2.0654E − 11 | $X^4Y^6$ | −3.1664E − 13 | $Y^7$ | −3.6560E − 10 |
| $XY^7$ | −8.5806E − 12 | $X^2Y^7$ | −4.2276E − 13 | $X^3Y^7$ | 9.0083E − 14 |
| $X^8$ | −1.3447E − 11 | $XY^8$ | 8.6794E − 13 | $X^2Y^8$ | 3.0496E − 14 |
| $Y^9$ | −5.3970E − 14 | $XY^9$ | −5.0927E − 15 | $Y^{10}$ | −2.0114E − 14 |

Example 3

Figure 6:
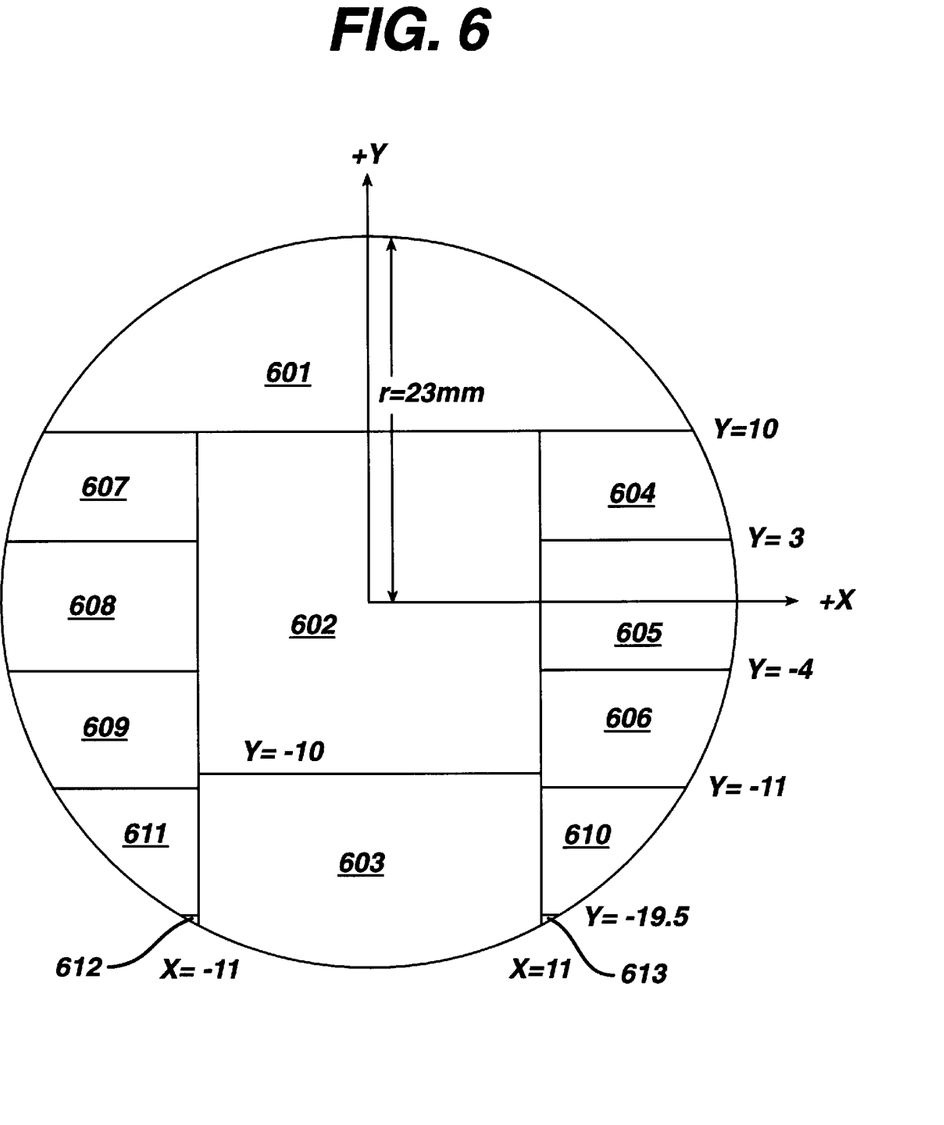
FIG. 6 is a plan view of a compensating surface of a lens of the invention.

In FIG. 6 is shown a discontinuous compensating surface of the invention, or surface with a sag discontinuity exceeding about 2 microns. The spherical zone is represented by segment 601 and channel 602, having an upper blend zone. The 601 segment is spherical and the 602 segment is described by a tenth order polynomial obtained by optimizing this segment for minimum astigmatism and best image quality at an image surface. The optimization protocol assigned specified weights to sag constraints at the top, y=10.0 line, second order derivatives the continuity conditions of which are as described in Table 1, Zernike coefficients, and the spot size of the image formed at the image surface. Similarly, the add power zone segment 603 was described by a tenth order polynomial maintaining the sag discontinuity with the channel segment 602 to below the value of 0.01 microns. The wings, 604 and 613, are horizontal strips optimized with weight on the sag constraint, allowing the sag discontinuity to rise to a maximum specified value of 15 microns, while constraining the first derivatives as well as the second derivatives and the Zernike coefficients. The weight on prism continuity is relaxed to allow prism discontinuity up to a maximum level of 0.25 diopters.

What is claimed is:

1. A lens having an astigmatism caused by at least one surface of the lens, the lens comprising a front surface and a compensating surface wherein the compensating surface compensates for the lens astigmatism, the compensating surface comprising a plurality of segments wherein each of the plurality of segments is defined by a tenth order x, y polynomial with Zernike coefficients.

2. The lens of claim 1 wherein the lens is a spectacle lens.

3. The lens of claim 2 wherein the spectacle lens is a progressive addition lens.

4. The lens of claim 1 further comprising at least one additional compensating surface wherein the at least one additional compensating surface compensates for the lens astigmatism.

5. The lens of claim 4 wherein one of the at least one additional compensating surface is a discontinuous surface.

6. A lens having an astigmatism caused by at least one surface of the lens, the lens comprising a front surface and a discontinuous compensating surface wherein the compensating surface compensates for the lens astigmatism, the compensating surface comprising a plurality of segments wherein each of the plurality of segments is defined by a tenth order x, y polynomial with Zernike coefficients.

7. The lens of claim 6 wherein the lens is a progressive addition spectacle lens.

8. The lens of claim 6 further comprising at least one additional compensating surface wherein the at least one additional compensating surface compensates for the lens astigmatism.

9. The lens of claim 8 wherein one of the at least one additional compensating surface is continuous.

10. The lens of claim 7 further comprising at least one additional compensating surface wherein the at least one additional compensating surface compensates for the lens astigmatism.

11. The lens of claim 10 wherein one of the at least one additional compensating surface is continuous.

12. A lens having an astigmatism caused by at least one surface of the lens, the lens comprising a front surface and a continuous compensating surface wherein the compensating surface compensates for the lens astigmatism, the compensating surface comprising a plurality of segments wherein each of the plurality of segments is defined by a tenth order x, y polynomial with Zernike coefficients.

13. The lens of claim 12 wherein the lens is a progressive addition spectacle lens.

14. The lens of claim 12 further comprising at least one additional compensating surface wherein the at least one additional compensating surface compensates for the lens astigmatism.

15. The lens of claim 14 wherein one of the at least one additional compensating surface is discontinuous.

16. The lens of claim 13 further comprising at least one additional compensating surface wherein the at least one additional compensating surface compensates for the lens astigmatism.

17. The lens of claim 16 wherein one of the at least one additional compensating surface is discontinuous.

18. A method for providing a lens comprising the steps of:

a.) dividing a front surface of a lens into a first plurality of segments, each of the plurality of segments of a size suitable for a tenth order x, y polynomial with Zernike coefficients to define the geometry for each segment;

b.) providing a compensating surface the compensating surface divided into a second plurality of segments of a size suitable for a tenth order x, y polynomial with Zernike coefficients to define a geometry for each segment wherein the compensating surface compensates for the lens astigmatism; and c.) optimizing the compensating surface to reduce a lens astigmatism of the lens.

* * * * *